United States Patent
Zeng

(10) Patent No.: US 12,005,949 B2
(45) Date of Patent: Jun. 11, 2024

(54) WHEEL SHOCK ABSORPTION STRUCTURE AND CHILD CARRIER

(71) Applicant: WONDERLAND SWITZERLAND AG, Steinhausen (CH)

(72) Inventor: Haibo Zeng, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 17/787,133

(22) PCT Filed: Dec. 18, 2020

(86) PCT No.: PCT/IB2020/062156
§ 371 (c)(1),
(2) Date: Jun. 17, 2022

(87) PCT Pub. No.: WO2021/124227
PCT Pub. Date: Jun. 24, 2021

(65) Prior Publication Data
US 2023/0013591 A1    Jan. 19, 2023

(30) Foreign Application Priority Data
Dec. 20, 2019   (CN) .......................... 201911333067.6

(51) Int. Cl.
*B62B 9/00*      (2006.01)
*B60B 33/00*     (2006.01)
*B60B 33/04*     (2006.01)

(52) U.S. Cl.
CPC .............. *B62B 9/00* (2013.01); *B60B 33/045* (2013.01); *B60B 33/0039* (2013.01);
(Continued)

(58) Field of Classification Search
CPC .. Y10T 16/212; B60B 33/045; B62B 2301/20
See application file for complete search history.

(56) References Cited

U.S. PATENT DOCUMENTS 904,270 A  *  11/1908  Lippy .................... A01B 15/00
                                                     280/84
2,660,465 A  *  11/1953  Gerson .................. E05C 19/04
                                                     292/75
(Continued)

FOREIGN PATENT DOCUMENTS

CN       202368627 U       8/2012
CN       203528580 U       4/2014
(Continued)

OTHER PUBLICATIONS

International Search Report mailed in corresponding International Patent Application No. PCT/IB2020/062156 dated Jun. 5, 2021, consisting of 4 pp. (English Translation Provided).
(Continued)

*Primary Examiner* — Emma K Frick
(74) *Attorney, Agent, or Firm* — Volpe Koenig

(57) ABSTRACT

A wheel shock absorption structure and a child carrier having the wheel shock absorption structure, including a wheel shaft and a wheel seat connected with a frame, and a lower end of the wheel seat is rotatably connected with a wheel through the wheel shaft. Further including a shock absorber with an elastic structure, an upper end of the shock absorber is removably connected with an upper end of the wheel seat, and the shock absorber rotates synchronously along with the wheel seat; a lower end of the shock absorber is rotatably connected with the wheel shaft which is slidably connected with the lower end of the wheel seat. The shock absorber is driven by sliding of the wheel shaft to generate recoverable elastic deformation to provide damping and buffering. The bending deformation of the shock absorber ensures that the wheel shock absorption structure has a better shock absorbing effect.

19 Claims, 5 Drawing Sheets

(52) U.S. Cl.
CPC ....... *B60B 33/0049* (2013.01); *B60B 33/0057* (2013.01); *B60B 33/0068* (2013.01); *B62B 2301/05* (2013.01); *B62B 2301/20* (2013.01)

(56) References Cited

U.S. PATENT DOCUMENTS

| | | | | |
|---|---|---|---|---|
| 2,885,720 | A | * | 5/1959 | Seeberger ............. B60B 33/021 16/35 R |
| 2,915,776 | A | * | 12/1959 | Hanson ................. B60B 33/045 16/21 |
| 2,923,961 | A | * | 2/1960 | Black ..................... B60B 33/045 16/21 |
| 2,942,290 | A | * | 6/1960 | Segal .................... B60B 33/021 188/74 |
| 2,987,752 | A | * | 6/1961 | Black ..................... B60B 33/045 29/524.1 |
| 3,102,298 | A | * | 9/1963 | Sheahan ................ B60B 33/021 267/134 |
| 4,027,898 | A | * | 6/1977 | Steen ...................... B60G 11/02 280/124.17 |
| 4,319,381 | A | * | 3/1982 | Rodaway .............. B60B 33/045 16/44 |
| 5,301,931 | A | * | 4/1994 | Bigo ......................... B62B 9/18 280/47.38 |
| 5,394,589 | A | * | 3/1995 | Braeger ............... B60B 33/0028 16/44 |
| 7,497,449 | B2 | * | 3/2009 | Logger ................. B60B 33/045 280/47.38 |
| 8,607,414 | B1 | * | 12/2013 | Kinsela ................. B60B 33/045 16/35 D |
| 8,967,647 | B1 | * | 3/2015 | Bastien ..................... B62B 9/18 280/124.127 |
| 9,636,948 | B2 | * | 5/2017 | Hillaert .................... A45C 5/14 |
| 11,077,357 | B2 | * | 8/2021 | Chen ..................... A63C 17/014 |
| 2004/0075247 | A1 | | 4/2004 | Lin |
| 2007/0257457 | A1 | | 11/2007 | Dotsey |
| 2008/0238016 | A1 | | 10/2008 | Chen |

FOREIGN PATENT DOCUMENTS

| | | | | |
|---|---|---|---|---|
| CN | 204821668 | U | | 12/2015 |
| CN | 209079966 | U | | 7/2019 |
| EP | 2853413 | A1 | * | 4/2015 ............. B60B 3/048 |
| GB | 2277017 | A | * | 10/1994 ......... B60B 33/0002 |
| JP | S6286201 | U | | 6/1987 |
| JP | 2001-277808 | A | | 10/2001 |
| JP | 2005178779 | A | | 7/2005 |
| JP | 2009154634 | A | * | 7/2009 |
| JP | 2009154634 | A | | 7/2009 |
| JP | 2011137435 | A | | 7/2011 |
| JP | 2016088418 | A | | 5/2016 |
| KR | 102466870 | B1 | * | 11/2022 .......... B60B 33/045 |
| KR | 20230094374 | A | * | 6/2023 |
| TW | M251749 | U | | 12/2004 |
| TW | M251749 | U | * | 12/2004 |
| TW | M309514 | U | | 4/2007 |

OTHER PUBLICATIONS

Written Opinion mailed in corresponding International Patent Application No. PCT/IB2020/062156 dated Jun. 5, 2021, consisting of 7 pp.
Office Action issued in corresponding Taiwanese Patent Application No. 109145020 dated Nov. 18, 2021.
Office Action issued in corresponding Chinese Patent Application No. 201911333067.6 dated Jan. 19, 2022.
Notice of Reasons for Refusal issued in counterpart Japanese Patent Application No. 2022-537114 dated Jun. 13, 2023.
Office Action issued in corresponding Japanese Application No. 2022-537114 dated Nov. 21, 2023.

* cited by examiner

WHEEL SHOCK ABSORPTION STRUCTURE AND CHILD CARRIER

CROSS-REFERENCE TO RELATED APPLICATIONS

This application is a 371 National Phase of International Application No. PCT/IB2020/062156, filed on Dec. 18, 2020, which claims priority to Chinese Application No. 201911333067.6, filed on Dec. 20, 2019, which are incorporated herein by reference as if fully set forth in their entirety.

TECHNICAL FIELD

This disclosure relates to the technical field of a child carrier, in particular to a wheel shock absorption structure on a child carrier

BACKGROUND

Now, there are a variety of child carriers, among which the child carrier with wheel is highly favored because it can reduce the adults' burden in replacement of using hands. As well known, the child carrier with the wheel inevitably encounters uneven ground during traveling, to suffer bumping and shaking, and thus affect safety performance and comfort performance of the child carrier. In view of this, the existing child carrier is generally provided with a shock absorption structure between the wheel and a wheel seat to ensure the comfort performance of the child carrier. However, the shock absorption structure of the existing child carrier has a short shock absorption stroke, which greatly affects damping and buffering effect. The wheel of the child carrier when travelling on the obvious concave and convex road are subject to great impact force from the ground, at this time, even if the shock absorption structure take an effect of the maximum shock absorption, some forces are still transmitted to a frame, to affect the safety performance and comfort performance of child carrier. Of course, there is a complicated shock absorption structure disposed between the wheel seat and the wheel in order to acquire a strong shock absorbing effect, but manufacturing cost of the child carrier is greatly increased due to such complicated shock absorption structure, and normal traveling of the child carrier can be impeded to some extent because of the strong shock absorbing effect.

Therefore, a wheel shock absorption structure with a simple structure and better shock absorbing effect is urgently needed.

SUMMARY the present disclosure provides a wheel shock absorption structure including a wheel shaft and a wheel seat connected with a frame, and a lower end of the wheel seat is rotatably connected with the wheel through the wheel shaft; the wheel shock absorption structure further includes a shock absorber with an elastic structure, an upper end of the shock absorber is removably connected with an upper end of the wheel seat, and the shock absorber rotates synchronously along with the wheel seat.

The child carrier of the present disclosure includes a frame and a wheel mounted on the frame, and also includes a wheel shock absorption structure connected between the frame and the wheel as the above mentioned, wherein an upper end of a wheel seat of the wheel shock absorption structure is connected with the frame, and the wheel is slidably connected with the lower end of the wheel seat through the wheel shaft.

DETAILED DESCRIPTION

The detailed description of the technical contents, construction features, and achieved effects of the present disclosure will be given below in conjunction with specific embodiments and accompanying drawings.

Figure 1:
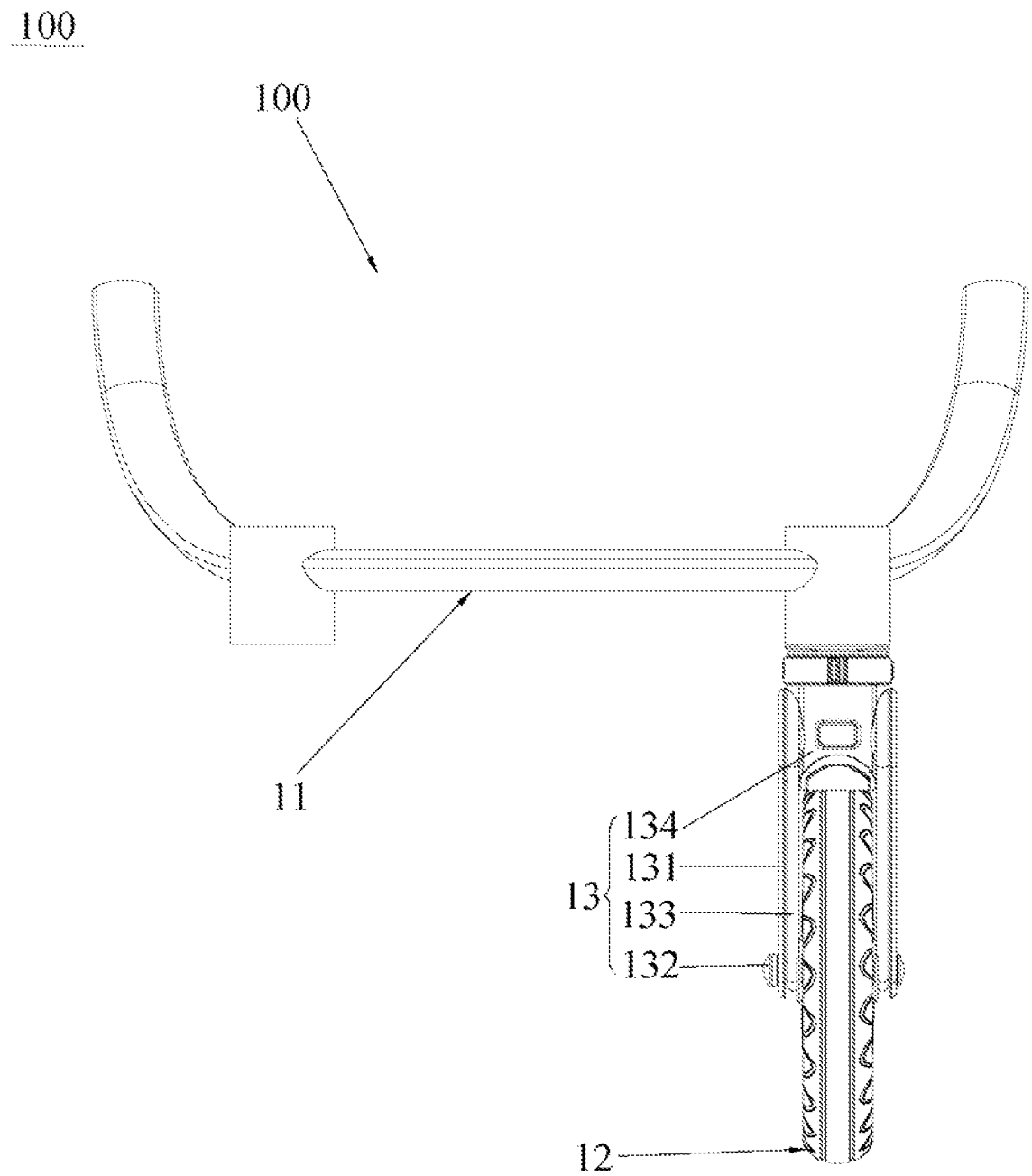
FIG. 1 is a schematic structural view of a child carrier with a wheel shock absorption structure of the present disclosure.

Referring to FIG. 1, a child carrier 100 of the present disclosure includes a frame 11 and a wheel 12 mounted on the frame 11, and also includes a wheel shock absorption structure 13 connected between the frame 11 and the wheel 12. An upper end of a wheel seat 131 of the wheel shock absorption structure 13 is connected with the frame 11, and the wheel 12 is slidably connected with the lower end of the wheel seat 131 through the wheel shaft 132. Specifically, the frame 11 of the present disclosure is a child bed frame 11 or a child stroller frame 11. When the child carrier 100 mounted with the wheel shock absorption structure 13 encounters uneven concave and convex road surface during traveling, so that the wheel 12 is subject to impact caused by concave and convex ground, the wheel 12 can be slidable relative to the wheel seat 131 and adaptively adjusted to a state adaptive to the uneven road surface, and when the wheel 12 travels through the uneven road surface, the wheel 12 eccentrically rotates at a certain angle except for sliding relative to the wheel seat 131, so as to drive the wheel shaft 132 to slide and allow eccentric rotation of the upper and lower ends of the shock absorber 133 synchronously (i.e., in the same direction and at the same angle). Meanwhile, a distance between the upper and lower ends of the shock absorber 133 is gradually shortened due to the sliding of the wheel shaft 132, so that the shock absorber 133 in a length direction penetrating through the entire wheel seat 131 undergoes bending deformation to provide damping and buffering for the wheel 12 so as to achieve the shock absorbing effect, thereby improving the safety performance and the comfort performance of the child carrier 100. Compared with that the shock absorber 133 in the prior art generally uses tension or compression deformation of a spiral spring to achieve the shock absorbing effect, the shock absorption stroke of the shock absorber 133 on the child carrier 100 of the present disclosure passes through the whole wheel seat 131 supporting the wheel 12, and the bending deformation of the shock absorber 133 with an elastic structure can realize the shock absorption, because of its long and effective shock absorption stroke, up and down of the uneven road surface can be timely and sensitively reflected in the bending deformation of the shock absorber 133, thereby providing a better shock absorbing effect. This shock absorbing effect can not only ensure the safety performance and the comfort performance of the child carrier 100, but also does not affect the normal travelling of the child carrier 100. Due to the bending deformation of the shock absorber 133 with an enduring effective shock absorption stroke and an elastic structure of the present disclosure, it is ensured that the wheel shock absorption structure 13 on the child carrier 100 has an optimal shock absorbing effect, and the structure of the child carrier 100 of the present disclosure is simple and practical, and thus is suitable for wide promotion and use.

Figure 2:
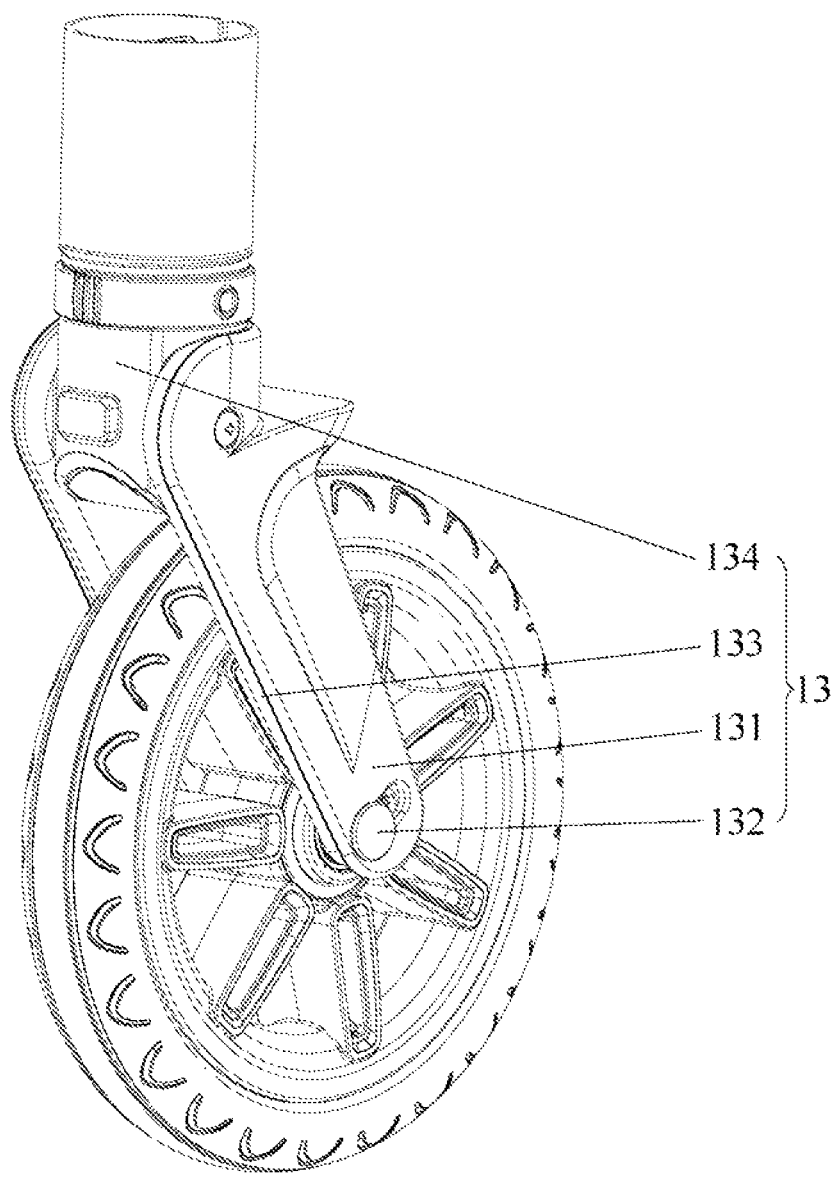
FIG. 2 is a schematic structural view of the wheel shock absorption structure of the present disclosure.
Figure 3:
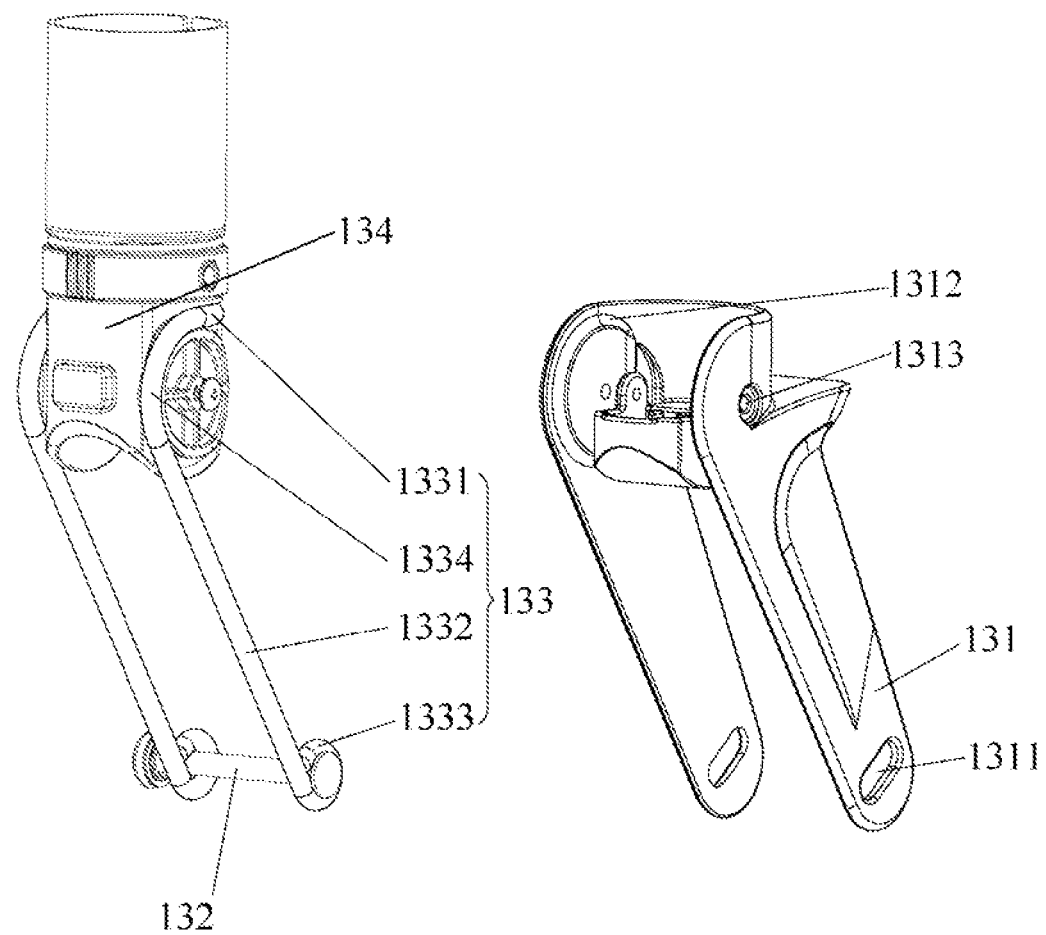
FIG. 3 is a schematic exploded structure view of the wheel shock absorption structure after removing the wheels in FIG. 2.

Referring to FIG. 2, the wheel shock absorption structure 13 of the present disclosure includes a wheel shaft 132, a wheel seat 131 for connecting with the frame, and an elastic shock absorber 133. In order to illustrate the wheel shock absorption structure 13 of the present disclosure more clearly, the wheel shock absorption structure 13 in FIG. 2 is exploded, as shown in FIG. 3 which is an exploded view of the wheel shock absorption structure 13 after removing the wheel 12. Specifically, the wheel shock absorption structure 13 of the present disclosure further includes a mounting seat 134, an upper end of the mounting seat 134 is rotatably connected with the frame 11 of the child carrier 100, an upper end of the wheel seat 131 is connected with the lower end of the mounting seat 134, and an upper end of the wheel seat 131 is connected with an upper end of the shock absorber 133; at the same time, the wheel shaft 132 is slidably connected to the lower end of the wheel seat 131, and the lower end of the wheel seat 131 is rotatably connected with the lower end of the shock absorber 133 through the wheel shaft 132, and the shock absorber 133 can rotate synchronously along with the wheel seat 131, so that the rotation of the mounting seat 134 can drive the synchronous rotation of the wheel seat 131 and the shock absorber 133, and such synchronous rotation can ensure that the upper and lower ends of the shock absorber 133 eccentrically move in the same direction and at the same angle, to effectively avoid shock absorber 133 from occurring distortion caused by the eccentric rotation of the wheel 12, and ensure normal steering and normal travelling of the wheel 12. When the wheel 12 travels on the uneven road surface, since the wheel 12 is subject to impact caused by concave and convex ground, the wheel shaft 132 can be slidable relative to the wheel seat 131 and enables to wheel 12 to be self-adaptively adjusted to an adaptive state to the uneven road surface. Such self-adaptive adjustment of the wheel 12 allows a distance between the upper and lower ends of the shock absorber 133 to be gradually shortened, so that the shock absorber 133 in a length direction penetrating through the entire wheel seat 131 undergoes bending deformation to effectively provide damping and buffering for the wheel 12 so as to achieve a better shock absorbing effect, thereby improving the safety performance and the comfort performance of the child carrier 100. Thus, the wheel shock absorption structure 13 of the present disclosure can not only effectively ensure the safety performance, the comfort performance and the normal travelling of the child carrier 100, but also provide a better shock absorbing effect.

The shock absorber 133 of the wheel absorption structure 13 of the present disclosure has a bending structure, and is the bending structure in a strip shape. The bending structure is beneficial to the bending deformation of the shock absorber 133, thereby realizing damping and buffering. Specifically, the shock absorber is formed by a strip-shaped object, which may be made of a thermoplastic elastomer or a rubber material. The shock absorber 133 of the present disclosure will be further described in detail with reference to FIGS. 3 to 5.

Figure 4:
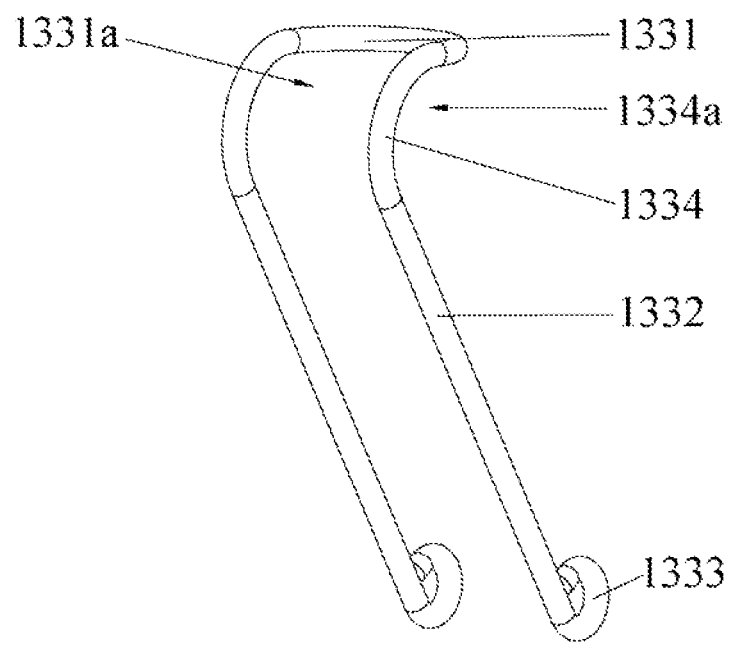
FIG. 4 is a schematic structural view of a shock absorber of the wheel shock absorber structure of the present disclosure.
Figure 5:
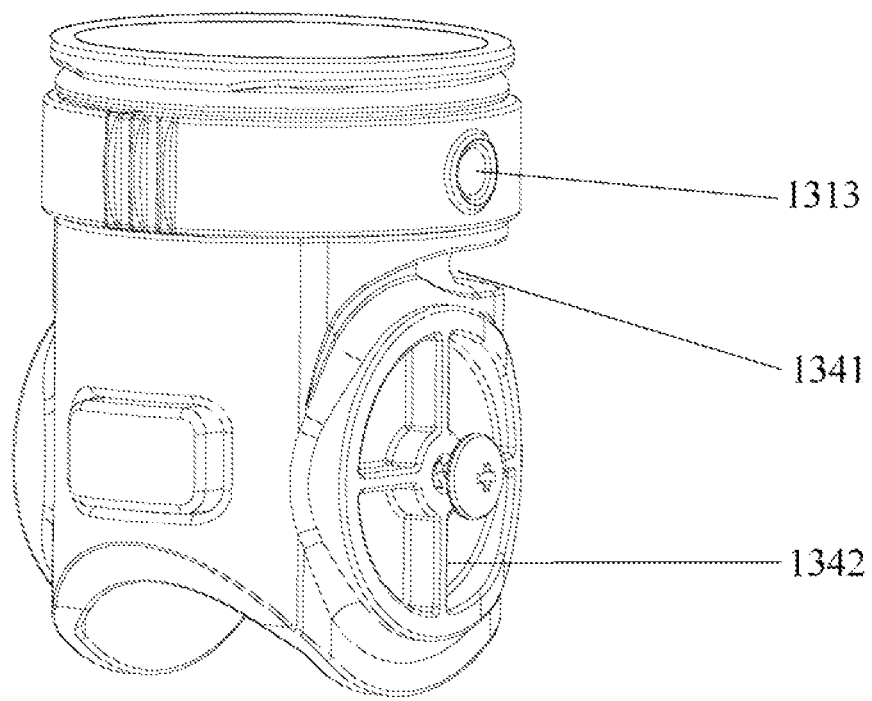
FIG. 5 is a schematic structural view of the mounting seat of the wheel shock absorption structure of the present disclosure.

Referring to FIGS. 3 to 5, the shock absorber 133 of the present disclosure includes a connection portion 1331 disposed on the mounting seat 134. The connection portion 1331 has a snap ring structure with an opening, and the mounting seat 134 is provided with a groove 1341 matched with the snap ring structure of the connection portion 1331. The connection portion 1331 is clamped to the mounting seat 134 through the groove 1341. The clamping of the groove 1341 can quickly realize connection and disconnection between the shock absorber 133 and the mounting seat 134. In addition, the connection portion 1331 of the shock absorber 133 of the present disclosure bends and extends toward the wheel shaft 132 to form a cantilever portion 1332. A lower end of the cantilever portion 1332 is curled to form a positioning ring 1333 for the wheel shaft 132 to insert. The positioning ring 1333 is rotatably sleeved on the wheel shaft 132. The sliding of the wheel shaft 132 drives the synchronous sliding of the positioning ring 1333, so that the cantilever portion 1332 is bent and deformed to achieve the shock absorbing effect. Specifically, in order to effectively position the shock absorber 133 on the mounting seat 134, the mounting seat 134 protrudes a positioning protrusion 1342 which can be fitted by the bending part 1334 of the cantilever portion 1332, and the bending part 1334 is clamped on the mounting seat 134 by the positioning protrusion 1342. Meanwhile, a direction of the opening 1331a of the snap ring structure of the connection portion 1331 of the present disclosure is opposite to a direction of a notch 1334a formed at the bending part 1334 of the cantilever portion 1332, and a plane where the snap ring structure of the connection portion 1331 is positioned is orthogonal to a plane where the cantilever portion 1332 is positioned. Because the direction of the opening 1331a is opposite to the direction of the notch 1334a, and the plane where the snap ring structure is positioned is orthogonal to the plane where the cantilever portion 1332 is positioned, so that the shock absorber 133 can be effectively positioned on the mounting seat 134, and the cantilever portion 1332 when suffering the force from the wheel shaft 132 can carry out sensitive bending deformation to provide shock absorption. More specifically, the upper end of the wheel seat 131 half-fits the mounting seat 134, and the upper end of the wheel seat 131 is also provided with a clamping protrusion 1312 on which the bending part 1334 of the cantilever portion 1332 is carried, the upper end of the shock absorber 133 is just clamped between the wheel seat 131 and the mounting seat 134, and such arrangement can ensure the using stability the shock absorber 133.

Continuing referring to FIG. 3, in order to get the wheel shaft 132 to be slidable and drive the shock absorber 133 to generate the bending deformation, the lower end of the wheel seat 131 of the present disclosure is provided with an elongated slot 1311 for the wheel shaft 132 to slide, and the elongated slot 1311 is obliquely arranged relative to the wheel seat 131. When the wheel 12 is subject to an impact from the ground to move upwardly relative to the wheel seat 131, the wheel shaft 132 slides on the obliquely arranged elongated slot 1311 to shorten the distance between the upper and lower ends of the shock absorber 133, and thereby causing the bending deformation of the shock absorber 133 to achieve a better shock absorbing effect.

Referring FIGS. 3 and 5, it should be noted that the shock absorber 133 in the wheel shock absorption structure 13 of the present disclosure can be detachably arranged. Specifically, the upper end of the wheel seat 131 corresponding to the mounting seat 134 is provided with a mounting hole 1313, and by means of the rotation of a pin, the upper end of the wheel seat 131 can be dissembled, and thus the upper end of the shock absorber 133 can be disassembled. Similarly, the wheel shaft 132 may be a removable bolt to realize the disassembly of the lower end of the wheel seat 131 and the lower end of the shock absorber 133, so that when the shock absorber 133 is aged or worn with the increase in use time, the shock absorber 133 can be replaced quickly and conveniently. The specific removable arrangement is well known to those skilled in the art.

It should be noted that the specific structure and function of the frame 11 involved in the present disclosure are known to those skilled in the art, and thus will not be described in detail here.

The above-disclosed are merely the preferred embodiments of the present disclosure, of course, are not employed to limit the scope of rights of the present disclosure. Therefore, equivalent changes made according to the scope of the present disclosure still fall within the scope of the present disclosure.

In an embodiment, a lower end of the shock absorber of the present disclosure is rotatably connected with the wheel shaft which is slidably connected with the lower end of the wheel seat; and the shock absorber is driven by sliding of the wheel shaft to generate recoverable elastic deformation to provide damping and buffering.

In an embodiment, the shock absorber is driven by the sliding of the wheel shaft to generate elastic bending deformation to provide damping and buffering. The recoverable bending deformation can provide a better shock absorbing effect, so as to ensure the safety performance and the comfort performance of the child carrier without affecting the normal traveling of the child carrier.

In an embodiment, the shock absorber of the present disclosure has a bending structure. The bending structure is beneficial to the bending deformation of the shock absorber, thereby realizing damping and buffering.

In an embodiment, the shock absorber of the present disclosure has a bending structure in a strip shape. Specifically, the shock absorber of the present disclosure is formed by a strip-shaped object. Specifically, the shock absorber may be formed by bending the strip-shaped object made of a thermoplastic elastomer or a rubber material.

In an embodiment, the present disclosure further includes a mounting seat rotatably connected with the frame, the upper end of the wheel seat is connected with the mounting seat, and rotation of the mounting seat synchronously drives rotation of the wheel seat and the shock absorber so as to ensure the upper and lower ends of the shock absorber eccentrically move to the same direction and the same angle.

In an embodiment, the shock absorber of the present disclosure includes a connection portion disposed on the mounting seat, and the connection portion has a snap ring structure with an opening.

In an embodiment, the mounting seat of the present disclosure is provided with a groove matched with the snap ring structure, and the snap ring structure is clamped on the mounting seat through the groove. Such clamping of the groove can quickly realize connection and disconnection between the shock absorber and the mounting seat.

In an embodiment, the connection portion of the present disclosure bends and extends toward the wheel shaft to form a cantilever portion, and a lower end of the cantilever portion is rotatably connected with the wheel shaft. The shock absorber in the wheel shock absorption structure provides damping and buffering for the wheels through the bending deformation of the cantilever portion.

In an embodiment, a bending part of the cantilever portion of the present disclosure is clamped on the mounting seat.

In an embodiment, the mounting seat protrudes of the present disclosure a positioning protrusion which is fitted by the bending part of the cantilever portion. The entanglement of the bending part and the positioning protrusion enables the shock absorber to be effectively positioned on the mounting seat, and enables the cantilever portion to perform sensitive bending deformation to provide a shock absorbing effect.

In an embodiment, a direction of the opening of the snap ring structure is opposite to a direction of a notch formed at the bending part of the cantilever portion.

In an embodiment, a plane where the snap ring structure of the present disclosure is positioned is orthogonal to a plane where the cantilever portion is positioned. Such arrangement is used to able the shock absorber to effectively position on the mounting seat.

In an embodiment, the lower end of the cantilever portion is curled to form a positioning ring for the wheel shaft to insert. The cantilever portion is slidably sleeved on the wheel shaft by means of the positioning ring.

In an embodiment, the upper end of the wheel seat half-fits the mounting seat, and the upper end of the shock absorber is clamped between the wheel seat and the mounting seat. The half-embracing of the wheel seat can ensure using stability of the shock absorber clamped between the wheel seat and the mounting seat.

In an embodiment, the upper end of the wheel seat protrudes a clamping protrusion on which the bending part of the cantilever portion is carried. The clamping protrusion can ensure the using stability of the shock absorber.

In an embodiment, the lower end of the wheel seat of the present disclosure is provided with an elongated slot for the wheel shaft to slide. The wheel shaft can be slidable through the elongated slot and drive the shock absorber to synchronously slide to the same direction.

In an embodiment, the elongated slot of the present disclosure is arranged obliquely relative to the wheel seat. The wheel shaft slides on the obliquely arranged elongated slot to allow the distance between the upper and lower ends of the shock absorber to become shorter, thereby causing the bending deformation of the shock absorber so as to achieve a better shock absorbing effect.

The wheel shock absorption structure of the present disclosure includes a shock absorber with an elastic structure, an upper end of the shock absorber is removably connected with an upper end of the wheel seat, the shock absorber can rotate synchronously along with the wheel seat; and a lower end of the shock absorber is slidably connected with a lower end of the wheel seat through a wheel shaft. The child carrier of the present disclosure includes a wheel absorption structure having a better shock absorbing effect. When the child carrier mounted with the wheel shock absorption structure encounters uneven ground surface during traveling, so that the wheels are subject to impact caused by concave and convex ground, the wheels can be slidable relative to the wheel seat and adaptively adjusted to a state adaptive to the uneven road surface, and when the wheels travel through the uneven road surface, the wheels eccentrically rotate at a certain angle except for sliding relative to the wheel seat, so as to drive the wheel shaft to slide and allow eccentric rotation of the upper and lower ends of the shock absorber synchronously (i.e., in the same direction and at the same angle). Meanwhile, a distance between the upper and lower ends of the shock absorber is gradually shortened due to the sliding of the wheel shaft, so that the entire shock absorber undergoes bending deformation to provide damping and buffering for the wheels so as to achieve the shock absorbing effect, thereby improving the safety performance and the comfort performance of the child carrier. In addition, the shock absorber of the child carrier in the prior art generally uses a spiral spring, although a greater shock absorber effect can be achieved by tension or compression deformation of the spiral spring, while adaptive adjustment sensitivity to the uneven road surface becomes lower due to a smaller shock absorption stroke, to some extent, to impede normal travelling of the child carrier. The shock absorption stroke of the shock absorber of the child carrier of the present disclosure passes through the whole wheel seat supporting the wheel, and the bending deformation of the shock absorber with an elastic structure realize the shock absorption, because of its long and effective shock absorption stroke, up and down of the uneven road surface can be timely and sensitively reflected in the bending deformation of the shock absorber, thereby providing a better shock absorbing effect. This shock absorbing effect can not only ensure the safety performance and the comfort performance of the child carrier, but also does not affect the normal travelling of the child carrier. Therefore, the bending deformation of the shock absorber with an enduring effective shock absorption stroke and an elastic structure can ensure that the wheel shock absorption structure on the child carrier has a better shock absorbing effect, and the structure of the child carrier of the present disclosure is simple and practical, and thus is suitable for wide promotion and use.

What is claimed is:

1. A wheel shock absorption structure, comprising:
a wheel shaft, a mounting seat, and a wheel seat, the mounting seat being rotatably connected with a frame and detachably connected with the wheel seat, a lower end of the wheel seat being rotatably connected with a wheel through the wheel shaft; and
a shock absorber with an elastic structure, an upper end of the shock absorber is connected with an upper end of the wheel seat, and the shock absorber rotates synchronously along with the wheel seat;
wherein the upper end of the wheel seat is coupled to the mounting seat, and the upper end of the shock absorber is clamped around the mounting seat and clamped between the wheel seat and the mounting seat.

2. The wheel shock absorption structure according to claim 1, wherein a lower end of the shock absorber is rotatably connected with the wheel shaft which is slidably connected with the lower end of the wheel seat; and the shock absorber is driven by sliding of the wheel shaft to generate recoverable elastic deformation to provide damping and buffering.

3. The wheel shock absorption structure according to claim 2, wherein the shock absorber is driven by the sliding of the wheel shaft to generate elastic bending deformation to provide damping and buffering.

4. The wheel shock absorption structure according to claim 3, wherein the shock absorber has a bending structure.

5. The wheel shock absorption structure according to claim 4, wherein the shock absorber is formed by bending a strip-shaped object.

6. The wheel shock absorption structure according to claim 1, wherein the lower end of the wheel seat is provided with an elongated slot for the wheel shaft to slide.

7. The wheel shock absorption structure according to claim 6, wherein the elongated slot is arranged obliquely relative to the wheel seat.

8. A child carrier comprising the frame and the wheel mounted on the frame, wherein the child carrier further comprises the wheel shock absorption structure according to claim 1 connected between the frame and the wheel, wherein the upper end of the wheel seat of the wheel shock absorption structure is connected with the frame, and the wheel is slidably connected with the lower end of the wheel seat through the wheel shaft.

9. The child carrier according to claim 8, wherein the frame is a child bed frame or a child stroller frame.

10. A wheel shock absorption structure, comprising:
a wheel shaft, a mounting seat, and a wheel seat, the mounting seat being rotatably connected with a frame and detachably connected with the wheel seat, a lower end of the wheel seat being rotatably connected with a wheel through the wheel shaft; and
a shock absorber with an elastic structure, an upper end of the shock absorber is connected with an upper end of the wheel seat, and the shock absorber rotates synchronously along with the wheel seat;
wherein the shock absorber comprises a connection portion disposed on the mounting seat, and the connection portion has a snap ring structure with an opening.

11. The wheel shock absorption structure according to claim 10, wherein the mounting seat is provided with a groove matched with the snap ring structure, and the snap ring structure is engaged with the mounting seat through the groove.

12. The wheel shock absorption structure according to claim 10, wherein the connection portion bends and extends toward the wheel shaft to form a cantilever portion, and a lower end of the cantilever portion is rotatably connected with the wheel shaft.

13. The wheel shock absorption structure according to claim 12, wherein a bending part of the cantilever portion is clamped on the mounting seat.

14. The wheel shock absorption structure according to claim 13, wherein the mounting seat protrudes a positioning protrusion which is fitted by the bending part of the cantilever portion.

15. The wheel shock absorption structure according to claim 13, wherein a direction of the opening of the snap ring structure is opposite to a direction of a notch formed at the bending part of the cantilever portion.

16. The wheel shock absorption structure according to claim 13, wherein the upper end of the wheel seat protrudes a clamping protrusion on which the bending part of the cantilever portion is carried.

17. The wheel shock absorption structure according to claim 12, wherein a plane where the snap ring structure is positioned is non-parallel to a plane where the cantilever portion is positioned.

18. The wheel shock absorption structure according to claim 12, wherein the lower end of the cantilever portion is curled to form a positioning ring for the wheel shaft to insert.

19. The wheel shock absorption structure according to claim 10, wherein the upper end of the wheel seat is coupled to the mounting seat, and the upper end of the shock absorber is clamped between the wheel seat and the mounting seat.

* * * * *